(12) United States Patent
Patrick et al.

(10) Patent No.: US 9,661,928 B2
(45) Date of Patent: May 30, 2017

(54) AIR BLADDER ASSEMBLY FOR SEAT BOTTOMS OF SEAT ASSEMBLIES

(71) Applicants: Lear Corporation, Southfield, MI (US); Winsen C. Zouzal, Detroit, MI (US)

(72) Inventors: Gerald Patrick, Shelby Township, MI (US); Samuel Hanlon, Livonia, MI (US); Michelle A. Pereny, Farmington Hills, MI (US); Winsen C. Zouzal, Detroit, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/869,093

(22) Filed: Sep. 29, 2015

(65) Prior Publication Data

US 2017/0086588 A1 Mar. 30, 2017

(51) Int. Cl.
*A47C 7/14* (2006.01)
*A47C 7/02* (2006.01)

(52) U.S. Cl.
CPC ............... *A47C 7/14* (2013.01); *A47C 7/022* (2013.01)

(58) Field of Classification Search
CPC ........... A47C 7/022; A47C 7/14; A47C 7/467; B60N 2/4415
See application file for complete search history.

(56) References Cited

U.S. PATENT DOCUMENTS

| 4,634,179 A * | 1/1987 | Hashimoto ............ A47C 7/467 297/284.6 |
| 4,679,855 A | 7/1987 | Hattori et al. |
| 5,707,109 A | 1/1998 | Massara et al. |
| 5,967,608 A | 10/1999 | Van Sickle |

(Continued)

FOREIGN PATENT DOCUMENTS

| CN | 201329822 Y | 10/2009 |
| CN | 201646470 U | 11/2010 |

(Continued)

OTHER PUBLICATIONS

U.S. Appl. No. 14/987,026, entitled "Seat Assemblies With Adjustable Side Bolster Actuators", filed Jan. 4, 2016, 15 pages.

(Continued)

*Primary Examiner* — Philip Gabler
(74) *Attorney, Agent, or Firm* — Brooks Kushman P.C.

(57) ABSTRACT

An air bladder system is provided with a pair of lateral spaced apart air bladder assemblies, each provided with a primary region received in a seat bottom of a seat assembly. The primary region is expandable in a height direction to support a pelvis of an occupant. A secondary region extends from the primary region and is expandable for angular adjustment relative to the primary region to support a femur of the occupant. A plurality of sensors detects a seating position of an occupant. A controller is in electrical communication with the sensors and the air bladder assemblies. The controller is configured to receive data from the plurality of sensors. The data is compared to determine if the (Continued)

occupant is seated evenly. At least one of the air bladder assemblies is adjusted to balance an uneven left-to-right occupant seating position.

12 Claims, 3 Drawing Sheets

(56) References Cited

U.S. PATENT DOCUMENTS

| | | | |
|---|---|---|---|
| 5,975,633 A | 11/1999 | Walk et al. | |
| 6,088,642 A | 7/2000 | Finkelstein et al. | |
| 6,088,643 A | 7/2000 | Long et al. | |
| 6,129,419 A | 10/2000 | Neale | |
| 6,203,105 B1 | 3/2001 | Rhodes, Jr. | |
| 6,220,667 B1 | 4/2001 | Wagner | |
| 6,273,810 B1 | 8/2001 | Rhodes, Jr. et al. | |
| 6,289,538 B1 | 9/2001 | Fidge | |
| 6,392,550 B1 | 5/2002 | Najor | |
| 6,398,303 B1 | 6/2002 | Herrmann et al. | |
| 6,578,916 B2 | 6/2003 | Longhi et al. | |
| 6,682,059 B1 | 1/2004 | Daniels et al. | |
| 7,131,697 B2 | 11/2006 | Beermann et al. | |
| 7,152,920 B2 * | 12/2006 | Sugiyama | B60N 2/002 297/284.1 |
| 7,797,771 B1 | 9/2010 | Bossen et al. | |
| 7,917,264 B2 | 3/2011 | Hozumi et al. | |
| 7,967,379 B2 | 6/2011 | Walters et al. | |
| 8,251,447 B2 | 8/2012 | Fujita et al. | |
| 8,348,339 B2 | 1/2013 | Onuma et al. | |
| 8,596,716 B1 | 12/2013 | Caruso | |
| 8,616,654 B2 | 12/2013 | Zenk et al. | |
| 8,678,500 B2 * | 3/2014 | Lem | B60N 2/4415 297/284.6 |
| 8,775,018 B2 | 7/2014 | Uenuma et al. | |
| 8,958,955 B2 * | 2/2015 | Hotary | B60N 2/0228 297/284.3 |
| 9,381,840 B2 | 7/2016 | Tobata et al. | |
| 2002/0056709 A1 | 5/2002 | Burt | |
| 2002/0089220 A1 | 7/2002 | Achleitner et al. | |
| 2002/0096915 A1 | 7/2002 | Haupt et al. | |
| 2002/0167486 A1 | 11/2002 | Tan et al. | |
| 2003/0023363 A1 | 1/2003 | Katz et al. | |
| 2003/0080699 A1 | 5/2003 | Rumney | |
| 2005/0067868 A1 | 3/2005 | Kern et al. | |
| 2006/0061315 A1 | 3/2006 | Schmidt et al. | |
| 2006/0290175 A1 | 12/2006 | Hartwich | |
| 2008/0009989 A1 | 1/2008 | Kim et al. | |
| 2008/0116730 A1 | 5/2008 | Connolly et al. | |
| 2008/0255731 A1 | 10/2008 | Mita et al. | |
| 2008/0267460 A1 | 10/2008 | Aoki et al. | |
| 2008/0277985 A1 | 11/2008 | Petzel | |
| 2009/0026821 A1 | 1/2009 | Macht et al. | |
| 2009/0030578 A1 | 1/2009 | Periot et al. | |
| 2009/0058661 A1 | 3/2009 | Gleckler et al. | |
| 2009/0099490 A1 | 4/2009 | Durt et al. | |
| 2009/0107258 A1 | 4/2009 | Saitoh et al. | |
| 2010/0031449 A1 * | 2/2010 | Cheng | A61H 9/0078 5/713 |
| 2010/0045087 A1 | 2/2010 | Pyun et al. | |
| 2010/0244504 A1 | 9/2010 | Colja et al. | |
| 2010/0276973 A1 | 11/2010 | Zenk et al. | |
| 2010/0283299 A1 | 11/2010 | Onuma et al. | |
| 2011/0031788 A1 | 2/2011 | Kosik et al. | |
| 2011/0112449 A1 | 5/2011 | Hopf et al. | |
| 2011/0210590 A1 | 9/2011 | Mori et al. | |
| 2012/0053794 A1 | 3/2012 | Alcazar et al. | |
| 2012/0086249 A1 | 4/2012 | Hotary et al. | |
| 2012/0096960 A1 | 4/2012 | Galbreath et al. | |
| 2012/0259248 A1 | 10/2012 | Receveur | |
| 2012/0283929 A1 | 11/2012 | Wakita et al. | |
| 2013/0009761 A1 | 1/2013 | Horseman | |
| 2013/0090816 A1 | 4/2013 | Huber | |
| 2013/0166078 A1 | 6/2013 | Heger et al. | |
| 2013/0175838 A1 | 7/2013 | Oshima et al. | |
| 2013/0251216 A1 | 9/2013 | Smowton et al. | |
| 2013/0313871 A1 | 11/2013 | Shalaby et al. | |
| 2014/0163333 A1 | 6/2014 | Horseman | |
| 2014/0167463 A1 | 6/2014 | Sakata et al. | |
| 2014/0319895 A1 | 10/2014 | Lange-Mao et al. | |
| 2014/0361590 A1 | 12/2014 | Line et al. | |
| 2015/0008710 A1 | 1/2015 | Young et al. | |
| 2015/0084985 A1 | 3/2015 | Baudu | |
| 2015/0097400 A1 | 4/2015 | Heys | |
| 2015/0099245 A1 | 4/2015 | Bouchard et al. | |
| 2015/0136146 A1 | 5/2015 | Hood et al. | |
| 2015/0351692 A1 | 12/2015 | Pereny et al. | |
| 2015/0352979 A1 | 12/2015 | O'Bannon et al. | |
| 2015/0352990 A1 | 12/2015 | Zouzal et al. | |
| 2015/0367751 A1 | 12/2015 | Lamesch et al. | |
| 2016/0101710 A1 | 4/2016 | Bonk et al. | |

FOREIGN PATENT DOCUMENTS

| | | |
|---|---|---|
| CN | 104252615 A | 12/2014 |
| DE | 19908655 C1 | 8/2000 |
| DE | 10331624 B3 | 4/2005 |
| DE | 10353020 A1 | 6/2005 |
| DE | 102005034069 A1 | 1/2007 |
| DE | 102005038289 B3 | 3/2007 |
| DE | 102006036532 A1 | 2/2008 |
| DE | 102009021532 A1 | 11/2010 |
| DE | 102011010210 A1 | 12/2011 |
| DE | 102010056568 A1 | 7/2012 |
| DE | 102012216869 A1 | 3/2014 |
| DE | 102012216178 A1 | 5/2014 |
| EP | 0489310 A1 | 6/1992 |
| EP | 2353928 A1 | 8/2011 |
| EP | 2353928 B1 | 9/2014 |
| FR | 2988051 A1 | 9/2013 |
| FR | 2988654 A1 | 10/2013 |
| FR | 2994073 A1 | 2/2014 |
| GB | 2370222 A | 6/2002 |
| TW | 477405 U | 5/2014 |
| WO | 2005074754 A1 | 8/2005 |
| WO | 2011144280 A1 | 11/2011 |
| WO | 2012159688 A1 | 11/2012 |
| WO | 2013144498 A1 | 10/2013 |
| WO | 2013170335 A1 | 11/2013 |
| WO | 2014066493 A2 | 5/2014 |
| WO | 2014085302 A1 | 6/2014 |

OTHER PUBLICATIONS

U.S. Appl. No. 14/716,197, entitled "Adjustable Seat Assembly", filed May 19, 2015, 22 pages.

U.S. Appl. No. 14/716,191, entitled "Adjustable Seat Assembly", filed May 19, 2015, 24 pages.

* cited by examiner

AIR BLADDER ASSEMBLY FOR SEAT BOTTOMS OF SEAT ASSEMBLIES

TECHNICAL FIELD

Various embodiments relate to adjustable seat assemblies.

BACKGROUND

An adjustable seat assembly is illustrated and described in U.S. Pat. No. 5,758,924, which issued on Jun. 2, 1998 to Lear Corporation.

SUMMARY

According to at least one embodiment, an air bladder assembly is provided with a primary region sized to be received in a seat bottom of a seat assembly. The primary region is expandable in a height direction to support a pelvis of an occupant. A secondary region extends from the primary region and is expandable for angular adjustment relative to the primary region to support a femur of the occupant.

According to at least another embodiment, an air bladder system is provided with a pair of laterally spaced apart air bladder assemblies. Each air bladder assembly is provided with a primary region sized to be received in a seat bottom of a seat assembly. Each primary region is expandable in a height direction to support a pelvis of an occupant. A secondary region extends from each primary region and is expandable for angular adjustment relative to the corresponding primary region to support a femur of the occupant.

According to at least another embodiment, a seat assembly is provided with a seat bottom. An air bladder system is oriented in the seat bottom. The air bladder system is provided with a pair of laterally spaced apart air bladder assemblies. Each air bladder assembly is provided with a primary region sized to be received in a seat bottom of a seat assembly. Each primary region is expandable in a height direction to support a pelvis of an occupant. A secondary region extends from each primary region and is expandable for angular adjustment relative to the corresponding primary region to support a femur of the occupant.

According to at least another embodiment, a seat assembly is provided with a seat bottom. A plurality of sensors is operably connected to the seat bottom to detect a seating position of an occupant. At least two air bladder assemblies are provided in the seat bottom and spaced apart laterally. Each air bladder assembly includes a region that is expandable to provide angular adjustment. A controller is in electrical communication with the plurality of sensors and the at least two air bladder assemblies. The controller is configured to receive data from the plurality of sensors. The data is compared to determine if the occupant is seated evenly. At least one of the at least two air bladder assemblies is adjusted to balance an uneven left-to-right occupant seating position.

According to at least another embodiment, a seat assembly is provided with a a seat bottom. At least two air bladder assemblies are provided in the seat bottom and spaced apart laterally. Each air bladder assembly includes a region expandable to provide angular adjustment. A plurality of sensors is operably connected to the seat bottom to detect a seating position of an occupant. A media device is provided with a graphical user interface. A controller is in electrical communication with the plurality of sensors and the media device. The controller is configured to receive data from the plurality of sensors. The data is compared to determine if the occupant is seated evenly. The media device is operated to inform the occupant of an uneven left-to-right seating position. Input is received that is indicative of manual adjustment from the graphical user interface. At least one of the at least two air bladder assemblies is adjusted in response to the manual adjustment input.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
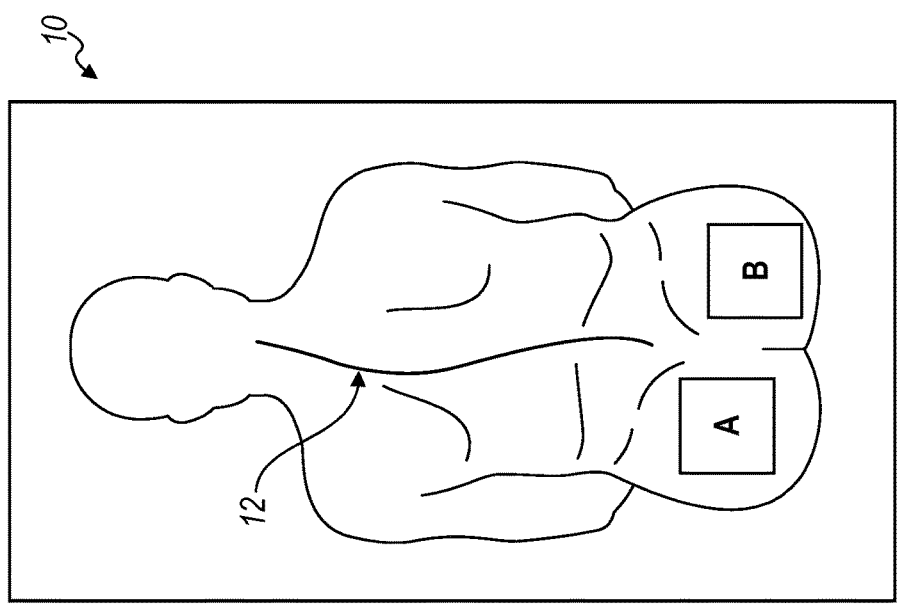
FIG. 1 is a schematic rear elevation view of an occupant, depicting a seating position.

FIG. 1 illustrates an unevenly seated occupant 10. The occupant 10 is depicted seated unevenly. Such uneven seating may be the result of poor posture. Uneven seating as depicted may also result from an undersized hemipelvis B, when compared to hemipelvis A. The uneven seating scenarios may cause a curvature of the spine 12. Such curvature to the spine may contribute to scoliosis or other health risks. Beyond health risks, such uneven seating may also be uncomfortable.

Figure 2:
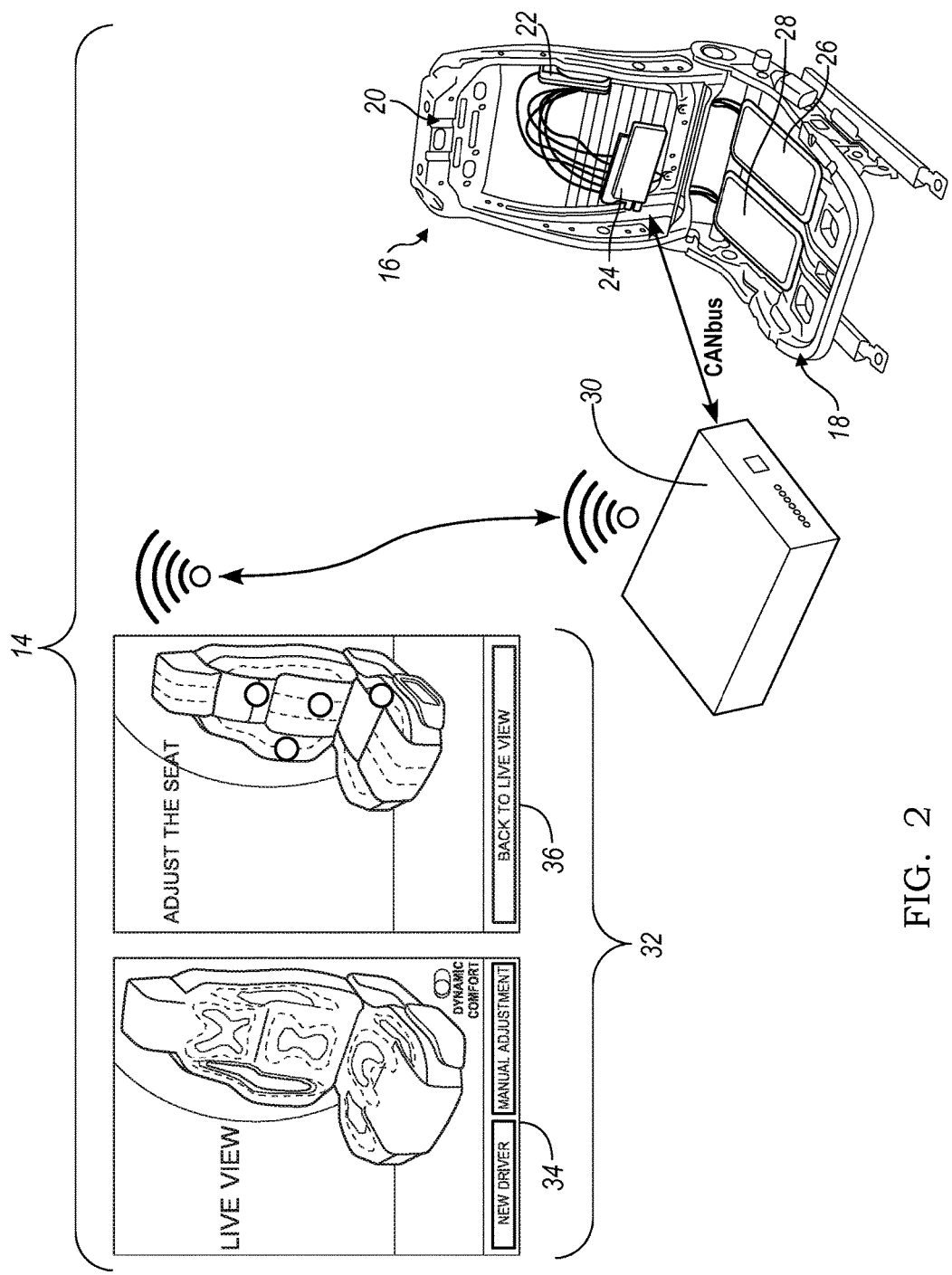
FIG. 2 is a schematic view of a seating system according to an embodiment.

FIG. 2 illustrates an adjustable seat system 14 according to an embodiment. The seat system 14 includes a seat assembly 16, which is illustrated with a cover and cushioning removed for revealing underlying components. The seat assembly 16 may be utilized as a vehicle seat assembly 16 for seating in a vehicle, such as an automobile, an aircraft, a watercraft, or the like. Of course, the seat assembly 16 may be utilized in any seating environment that may benefit from an adjustable seat assembly 16 or system 14.

The seat assembly 16 includes a seat bottom 18, which may be adapted to be mounted for motor-driven adjustable translation in a fore and aft direction and in an up and down direction of a vehicle. The seat assembly 16 includes a seat back 20, which may be pivotally connected to the seat bottom 18 to extend generally upright relative to the seat bottom 18 for motor-driven pivotal adjustment relative to the seat bottom 18. A head restraint (not shown) is mounted for motor-driven adjustable translation to the seat back 20.

A compressor 22 provides a source of air to the seat assembly 16. A memory control seat module (MCSM) and valve bank are provided on the seat back 20 and identified generally as a controller 24. The controller 24 regulates compressed air into and out of the seat assembly 16. The seat bottom 18 includes a pair of air bladder assemblies 26, 28. The controller 24 communicates with a gateway module 30 through a CANbus connection. The gateway module 30 may be installed in or under the seat, or anywhere in the vehicle.

The gateway module 30 communicates with an interface 32 via a wireless communication. The interface 32 may be integrated into the vehicle, such as an instrument panel display that is in suitable wired or wireless communication with the controller 24. The interface 32 may be remote, such as a smart device including phones, tablets and the like. The interface 32 is depicted as a smart device application. The remote interface 32 may permit a user to transport settings to each vehicle, such as personal passenger vehicles, airline seating, rental cars, and the like. The smart device application is further described in Pereny et al. U.S. patent application Ser. No. 14/560,487 filed on Dec. 4, 2014, which is incorporated in its entirety by reference herein.

FIG. 2 illustrates two display images 34, 36 from the interface 32. Each of the air bladder assemblies 26, 28 may include at least one pressure sensor to detect air pressure in the respective air bladder assembly 26, 28. Any pressure sensor is contemplated, such as a pneumatic pressure sensor at the outlet valve of each respective air bladder assembly 26, 28. Pressure can also be sensed by contact pressure sensors disposed in front of or behind some or all of the respective air bladder assemblies 26, 28, including on a front or rear surface thereof. The contact pressure sensors may include pressure-sensing mats, such as those available by Tekscan®, Inc. of 307 West First Street, South Boston, Mass., 02127-1309, USA. Display image 34 depicts the vehicle seat assembly 16 with zones ranging in color to depict a distribution of pressure upon the seat assembly 16. This visualization may assist an occupant in positioning upon the seat assembly 16 with live visual feedback.

Figure 3:
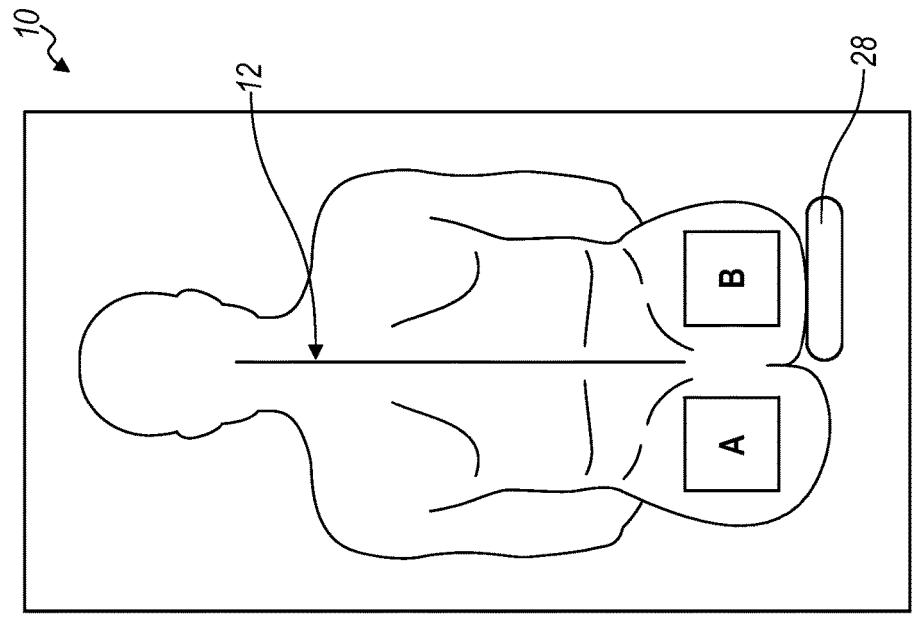
FIG. 3 is another schematic rear view of the occupant of FIG. 1 seated upon the seating system of FIG. 2, depicting another seating position.

The seat system 14 improves posture by providing a power pneumatic hemipelvis support in the seat bottom 18 which provides support to the pelvis in a seated position to allow the occupant to correct conditions of functional Scoliosis caused by a small hemipelvis. The system supports 26, 28 are specifically shaped to provide Ischia lift for the right hand (B in FIGS. 1 and 3) or left hand (A in FIGS. 1 and 3) pelvis to compensate for a small hemipelvis and to help reduce Scoliosis (a sideways curve in the spine 12). FIG. 3 illustrates a corrected seating position with a straightened spine 12 in contrast to the seating position of FIG. 1.

The seat system 14 also provides support to the femurs from the air bladder assemblies 26, 28. The seat system 14 can detect differences in air pressure (LH/RH) at the controller 24 and graphically display the pressure distribution on the display image 34. Corrections can be made to the air pressures RH/LH in the air bladder assemblies 26, 28 via an algorithm in the controller 24. Alternatively individual adjustment can be input by the occupant or user at display image 36 of the interface 32. Each hemipelvis support 26, 28 can be adjusted individually to achieve an optimum support condition for a variety of Scoliosis/posture issues and conditions. The manual and automatic adjustment may both be offered by the seating system 14 under different seat settings which may be selected at the interface 32.

Figure 6:
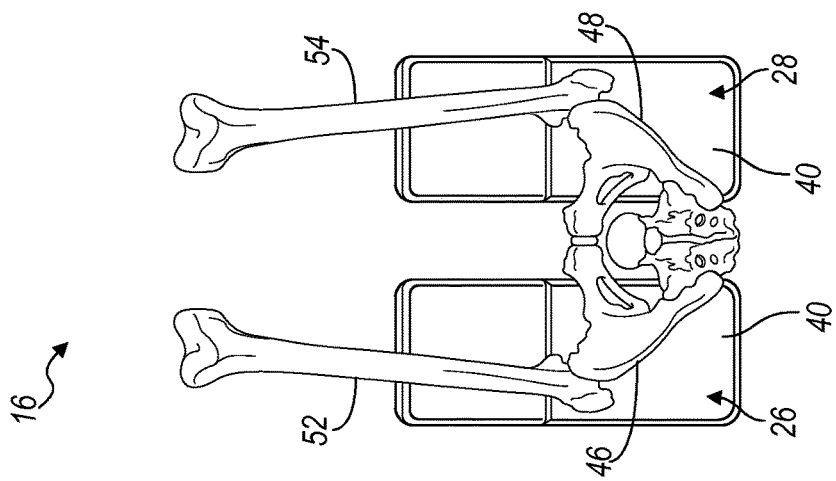
FIG. 6 is a schematic top view of the skeletal occupant seated upon the seating system of FIG. 2.
Figure 5:
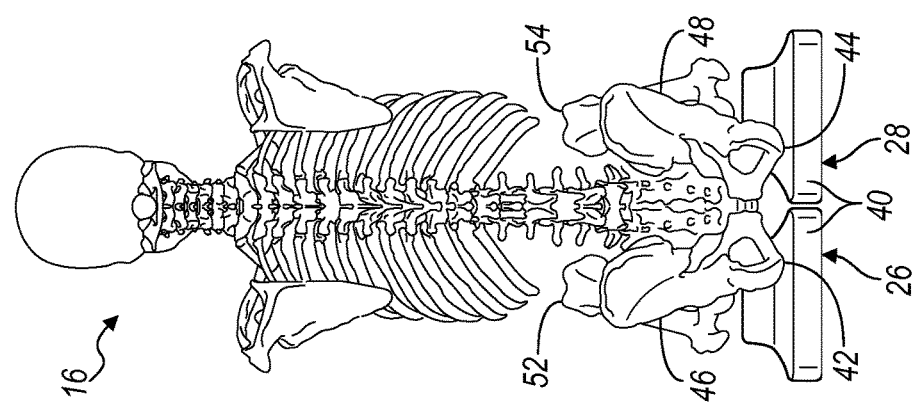
FIG. 5 is a schematic rear elevation view of the skeletal occupant seated upon the seating system of FIG. 2.
Figure 4:
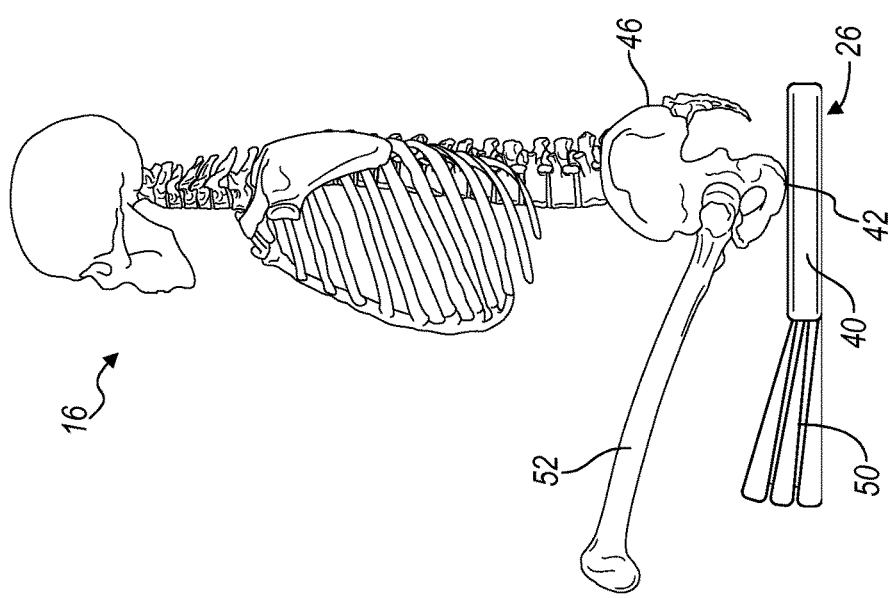
FIG. 4 is a schematic side elevation view of a skeletal occupant seated upon the seating system of FIG. 2.

FIGS. 4-6 depict the seat assembly 16 with a seat frame, cover and trim removed to illustrate the air bladder assemblies 26, 28 in greater detail. The air bladder assemblies 26, 28 are illustrated in cooperation with a skeletal occupant 38 for discussion of mechanical orientations of relevant biomechanical features of occupants. The air bladder assemblies 26, 28 are spaced apart laterally for supporting opposite lateral sides of the occupant 38 with independent adjustment of each lateral side.

The air bladder assemblies 26, 28 each include a primary region 40 oriented to support an ischium 42, 44 of a hemipelvis 46, 48. Each primary region 40 provides support in a seating plane. Each primary region 40 is expandable in at least a height direction to adjust the height of each hemipelvis 46, 48 independently. Each air bladder assembly 26, 28 also includes a secondary region 50 extending forward away from the primary region 40 for supporting one of the femurs 52, 54 of the occupant 38.

Each secondary region 50 is inclined away from the primary region 40 providing an obtuse angle between the respective seating surfaces. The secondary region 50 may include a bellows about its periphery such that inflation of the secondary region 50 results in greater expansion away from the primary region 40 to adjust an angle of the corresponding femur 52, 54, by pivoting the femur 52, 54 upward. Likewise, the angle between the support surfaces of the primary and secondary regions 40, 50 is decreased during inflation and increased during deflation.

The secondary regions 50 may be independently controlled relative to the primary regions 40 for further adjustment options of the hemipelvises 46, 48 and femurs 52, 54 for correcting alignment of the spine 12.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat bottom;
   a plurality of sensors operably connected to the seat bottom to detect a seating position of an occupant;
   at least two air bladder assemblies provided in the seat bottom and spaced apart laterally, each air bladder assembly comprising a region expandable to provide angular adjustment; and
   a controller in electrical communication with the plurality of sensors and the at least two air bladder assemblies, the controller being configured to:
   receive data from the plurality of sensors,
   compare the data to determine if the occupant is seated evenly, and
   adjust at least one of the at least two air bladder assemblies to balance an uneven left-to-right occupant seating position.

2. The seat assembly of claim 1 wherein each of the at least two air bladder assemblies further comprises:
   a primary region expandable in a height direction to support a pelvis of an occupant; and
   a secondary region extending from the primary region and expandable for angular adjustment relative to the primary region to support a femur of the occupant.

3. The seat assembly of claim 2 wherein the secondary region of each of the at least two air bladder assemblies comprises a bellows chamber to permit greater expansion spaced apart from the primary region than expansion that is permitted adjacent to the primary region.

4. The seat assembly of claim 2 wherein each primary region of the at least two air bladder assemblies provides a support surface that is perpendicular to the height direction; and wherein each secondary region of the at least two air bladder assemblies provides a support surface that is generally inclined away from the primary region.

5. The seat assembly of claim 4 wherein an angle between each primary region support surface of the at least two air bladder assemblies and the corresponding secondary region support surface decreases during inflation.

6. The seat assembly of claim 5 wherein the angle between each primary region support surface of the at least two air bladder assemblies and the corresponding secondary region support surface defines an obtuse angle at maximum inflation.

7. The seat assembly of claim 5 wherein the angle between each primary region support surface of the at least two air bladder assemblies and the corresponding secondary region support surface defines an obtuse angle at minimum inflation.

8. A seat assembly comprising:
a seat bottom;
at least two air bladder assemblies provided in the seat bottom and spaced apart laterally, each air bladder assembly comprising a region expandable to provide angular adjustment;
a plurality of sensors operably connected to the seat bottom to detect a seating position of an occupant;
a media device with a graphical user interface; and
a controller in electrical communication with the plurality of sensors and the media device, the controller being configured to:
receive data from the plurality of sensors,
compare the data to determine if the occupant is seated evenly,
operate the media device to inform the occupant of an uneven left-to-right seating position,
receive input indicative of manual adjustment from the graphical user interface, and
adjust at least one of the at least two air bladder assemblies in response to the manual adjustment input.

9. The seat assembly of claim 8 wherein each of the at least two air bladder assemblies further comprises:
a primary region expandable in a height direction to support a pelvis of an occupant; and
a secondary region extending from the primary region and expandable for angular adjustment relative to the primary region to support a femur of the occupant.

10. The seat assembly of claim 9 wherein the secondary region of each of the at least two air bladder assemblies comprises a bellows chamber to permit greater expansion spaced apart from the primary region than expansion that is permitted adjacent to the primary region.

11. The seat assembly of claim 9 wherein each primary region of the at least two air bladder assemblies provides a support surface that is perpendicular to the height direction; and wherein each secondary region of the at least two air bladder assemblies provides a support surface that is generally inclined away from the primary region.

12. The seat assembly of claim 11 wherein an angle between each primary region support surface of the at least two air bladder assemblies and the corresponding secondary region support surface decreases during inflation.

* * * * *